J. D. Wilber,
Mower.
No. 70,059 — Patented Oct. 22, 1867.
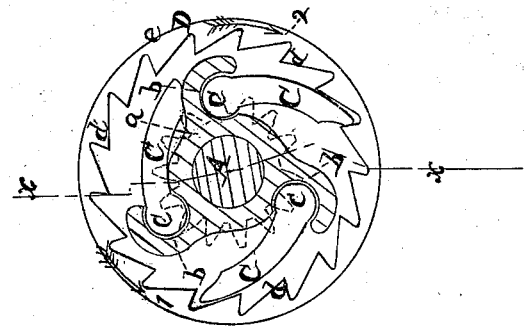
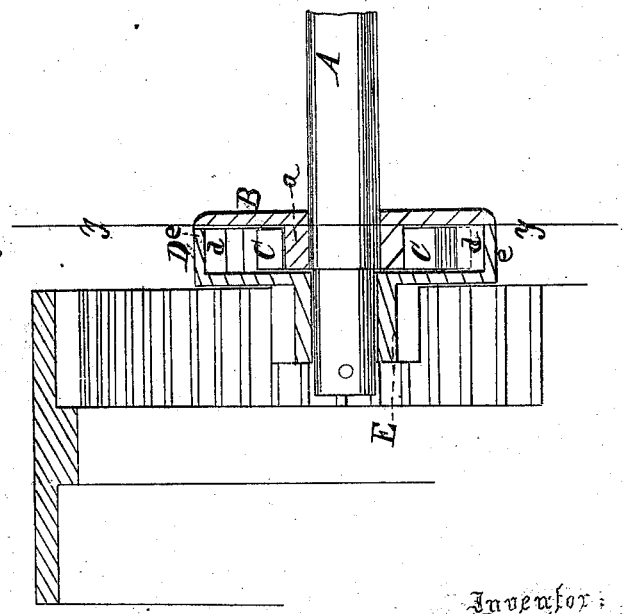

UNITED STATES PATENT OFFICE.

JOHN D. WILBER, OF POUGHKEEPSIE, NEW YORK.

IMPROVEMENT IN HARVESTERS.

Specification forming part of Letters Patent No. 70,059, dated October 22, 1867.

*To all whom it may concern:*

Be it known that I, JOHN D. WILBER, of Poughkeepsie, in the county of Dutchess, and State of New York, have invented a new and Improved Pawl-and-Ratchet Connection for Mowers and Reapers; and I do hereby declare that the following is a full, clear, and exact description thereof, which will enable others skilled in the art to make and use the same, reference being had to the accompanying drawings, forming a part of this specification, in which—

Figure 1 is a section of my invention, taken in the line $x\,x$, Fig. 2; Fig. 2, a vertical section of the same, taken in the line $y\,y$, Fig. 1.

Similar letters of reference indicate like parts.

This invention relates to a new and improved pawl-and-ratchet connection for reaping and mowing machines; and it consists in using a plurality of pawls, three being a desirable number, fitted in sockets attached to the axle, and inclosed within a hollow ratchet placed loosely on the axle, and having a pinion connected to it, which gears into a toothed segment on the driving-wheel, all being arranged as hereinafter fully shown and described, whereby the pawls are made to engage with the ratchet without the aid of a spring or springs, and a connection formed between the axle and driving-wheels when the machine is drawn forward, so as to communicate motion to the sickle and other working parts, and no connection formed between the driving-wheels and the axle when the machine is backed.

The object of the invention is to obtain a simple and efficient pawl-and-ratchet arrangement for the purpose specified, which will operate noiselessly, or nearly so, and to avoid the use of springs, which occasion considerable noise, and are liable to be rendered inefficient or inoperative by oxidation, continued use, or other causes.

A represents a portion of the axle of a mower or reaper, and B is a circular plate, which is keyed firmly and concentrically thereon. This plate B is cast with a hub or lateral projection, $a$, at one side of it, in which hub or projection there are three sockets, $b$, to receive the ends $c$ of pawls C, said ends $c$ being of circular form, corresponding with the form of the sockets, and admitting of the pawls working freely, no rivet or special attachment being required. (See Fig. 2.) D represents what may be termed a hollow ratchet, constructed of a cylindrical shell, open at one side, against which open side the plate B abuts. The teeth $d$ of this ratchet are at the inner side of the rim $e$ of the shell, and the ratchet D is placed loosely on the axle A, and has a pinion, E, at its outer side, said pinion being cast with or permanently attached to the pawl. This pinion E gears into a toothed rim attached to one of the wheels which support the main frame of the machine.

It will be understood that both of the wheels on which the main frame of the machine is mounted are placed loosely on the axle A, and both provided with concentric toothed rims, as there are two of the pawl-and-ratchet arrangements above described applied to the axle A, one for each wheel.

From the above description it will be seen that where the machine is drawn forward, one or more of the pawls C will, by virtue of their own gravity, engage with the teeth $d$ of the ratchet D, the direction of the rotation of which is indicated by arrow 1, and the wheels on which the main frame of the machine is mounted will consequently rotate the axle A and communicate motion to the sickle and other working parts; and it will further be seen that when the machine is backed the teeth $d$ of the ratchet (the direction of the rotation of which is indicated by annexed 2) will slip or pass over the pawls and not communicate motion to the axle.

Thus by this simple means I dispense entirely with the application of springs to the pawls, the device operates noiselessly, or nearly so, and there are no parts liable to get out of repair or become deranged by use.

I claim as new and desire to secure by Letters Patent—

The combination of a ratchet with free or independent pawls, one or more, arranged so as to operate—that is to say, engage with and disengage themselves from the ratchet by virtue of their own gravity only—substantially as set forth.

J. D. WILBER.

Witnesses:
WM. F. McNAMARA,
ALEX. F. ROBERTS.